(12) United States Patent
Knoedler et al.

(10) Patent No.: US 8,348,009 B2
(45) Date of Patent: Jan. 8, 2013

(54) STEERING DEVICE, PARTICULARLY ELECTRIC SERVO STEERING DEVICE FOR A MOTOR VEHICLE

(75) Inventors: Helmut Knoedler, Lorch (DE); Michael Ochs, Bartholomae (DE); Hans Koehnle, Leinzell (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/418,928

(22) Filed: Mar. 13, 2012

(65) Prior Publication Data
US 2012/0205184 A1 Aug. 16, 2012

Related U.S. Application Data

(63) Continuation of application No. PCT/EP2010/063270, filed on Sep. 10, 2010.

(30) Foreign Application Priority Data

Sep. 17, 2009 (DE) .......................... 10 2009 029 538

(51) Int. Cl.
*B62D 5/04* (2006.01)

(52) U.S. Cl. .......................... 180/444; 180/443; 180/446

(58) Field of Classification Search .................. 180/444, 180/443, 446
See application file for complete search history.

(56) References Cited

U.S. PATENT DOCUMENTS

| 7,055,646 | B2 | 6/2006 | Bugosh | |
|---|---|---|---|---|
| 7,490,696 | B2* | 2/2009 | Saruwatari et al. | 180/444 |
| 7,635,046 | B2* | 12/2009 | Tominaga et al. | 180/444 |
| 7,823,686 | B2* | 11/2010 | Arbanas | 180/444 |
| 7,886,865 | B2* | 2/2011 | Sekine et al. | 180/444 |
| 7,909,130 | B2* | 3/2011 | Morikawa et al. | 180/444 |
| 8,002,076 | B2* | 8/2011 | Yoshinari et al. | 180/444 |
| 8,102,138 | B2* | 1/2012 | Sekine et al. | 318/646 |
| 8,162,095 | B2* | 4/2012 | Bootz et al. | 180/406 |
| 8,235,166 | B2* | 8/2012 | Konrad et al. | 180/444 |
| 2004/0060766 | A1* | 4/2004 | Hayakawa et al. | 180/444 |
| 2005/0167183 | A1* | 8/2005 | Tominaga et al. | 180/444 |

FOREIGN PATENT DOCUMENTS

| DE | 195 44 755 | 6/1996 |
|---|---|---|
| DE | 103 92 534 | 7/2005 |
| DE | 10 2006 051 799 | 5/2008 |
| DE | 10 2007 038 902 | 2/2009 |
| EP | 0 133 003 | 2/1985 |
| WO | WO-2008/052915 | 5/2008 |

\* cited by examiner

*Primary Examiner* — Lesley D Morris
*Assistant Examiner* — Marlon Arce
(74) *Attorney, Agent, or Firm* — Jordan and Hamburg LLP

(57) ABSTRACT

A steering device, in particular an electric power-steering device for a motor vehicle, comprising an axially parallel drive which has a steering gearbox housing, a steering axle, a steering element, and at least one axle steering mechanism connected to the steering element, having a motor unit disposed on the steering gearbox housing, having a servo gearbox disposed in a gearbox cover and having a control unit for the motor unit, which is disposed in a control device housing. The control device housing of the control unit is disposed on one axially parallel side of the servo gearbox, and a motor housing of the motor unit is disposed on the other axially parallel side of the servo gearbox.

7 Claims, 3 Drawing Sheets

STEERING DEVICE, PARTICULARLY ELECTRIC SERVO STEERING DEVICE FOR A MOTOR VEHICLE

This is a Continuation of U.S. National Stage of PCT/EP2010/063270 filed Sep. 10, 2010.

BACKGROUND OF THE INVENTION

Steering devices are known from DE 10 2006 051 799 A1, EP 0 133 003 B1 and DE 103 92 534 T5, for example.

DE 10 2007 083 902 A1 describes an electric power-steering device comprising an axially parallel drive which has a steering gearbox housing, a steering axle, a steering element and at least one axle steering mechanism connected to this steering element. The power-steering device further comprises a control unit and a motor unit, which are disposed axially parallel and on the same side with respect to a servo gearbox.

Steering devices for motor vehicles are often equipped with power-assistance units which are referred to as power-steering devices. The power assistance is provided, inter alia, by way of hydraulic power assistance or electric power assistance in which servo action is generated using an electric motor. To this end, the electric motor having the gearbox and the control unit for the electric motor are disposed on the housing of the power-steering device, generally parallel to the steering device.

When the driver initiates a rotational steering motion by way of the steering axle, the steering axle which is moved in a rotational manner induces translational steering of the axle. A rack-and-pinion connection serves as the steering element in this case. The steering axle is generally equipped with torque sensors which serve as signal generators for the steering direction and the required steering torque of a control unit or an open-loop/closed-loop control unit for the electric motor.

The housing of the electric motor is flange-mounted together with the control unit on the housing of the steering device. The disadvantage of such a steering system, however, is that the servo gearbox comprising the electric motor and the associated control unit for has a long length relative to the steering device. Since the entire servo unit is disposed either to the left or right of the servo gearbox of the servo unit, if the servo unit is located towards the steering spindle, it often conflicts with the exhaust system or oil pan, which are located in the middle. If located towards the wheel well, the servo unit has greater exposure to splash water and stone impact.

To prevent disadvantageous long lengths, it is also known to locate the control unit separately at a separate point and connect it to the electric motor and the servo gearbox thereof by way of a control unit connection. As a result, however, the electrical lines are located on the outside, which is disadvantageous, as these are at risk of becoming damaged, for example.

SUMMARY OF THE INVENTION

The object of the present invention, therefore, is to create a steering system in which there are no external electrical lines between the electric motor and the control unit, but which does not have an extremely great overall length.

In contrast to the prior art, in which the motor unit and the associated control unit are both disposed either to the left or the right of the gearbox, the control device housing comprising the control unit and the motor housing comprising the motor unit are now disposed, according to the invention, on different sides of the servo gearbox. This design results in better utilization of the available installation space, and the overall length of the steering device is not disadvantageously increased by the servo unit.

Advantageously, the control device housing and the motor housing can each be equipped with a flange, wherein the servo gearbox is located between the two flanges. A connection between the two flanges can be implemented by interconnecting the control device housing and the motor housing to the radial exterior of the servo gearbox disposed therebetween.

Advantageous embodiments and developments of the invention will become apparent from the remaining dependent claims.

Hereafter, exemplary embodiments of the invention are described with respect to the principle thereof, with reference to the drawings.

DETAILED DESCRIPTION OF THE PREFERRED EMBODIMENTS

An electromechanical steering system comprising a steering device having an axially parallel drive and an electric motor which transfers a power-steering force by way of a gearbox to a ball nut/spindle gearbox, for example, is known from the prior art, and therefore only the features that are essential to the invention will be addressed in the following. With respect to the prior art, reference is made to the initially mentioned documents, by way of example.

Figure 1:
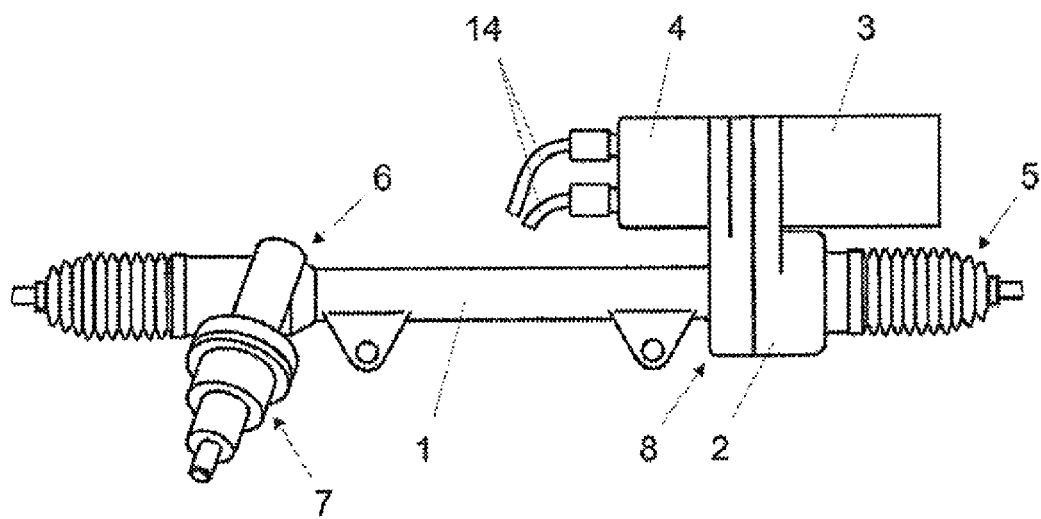
FIG. 1 is a steering device comprising an electric power-steering device, in particular for motor vehicles.

FIG. 1 shows a steering device comprising a steering gearbox housing 1, a gearbox cover 2, an electric motor 3, an open-loop/closed-loop control unit 4, a rack 5 for deflecting vehicle wheels, which are not shown, a pinion 6 having a torque sensor 7, and a servo gearbox 8, for example a traction drive, in the gearbox cover 2.

Figure 2:
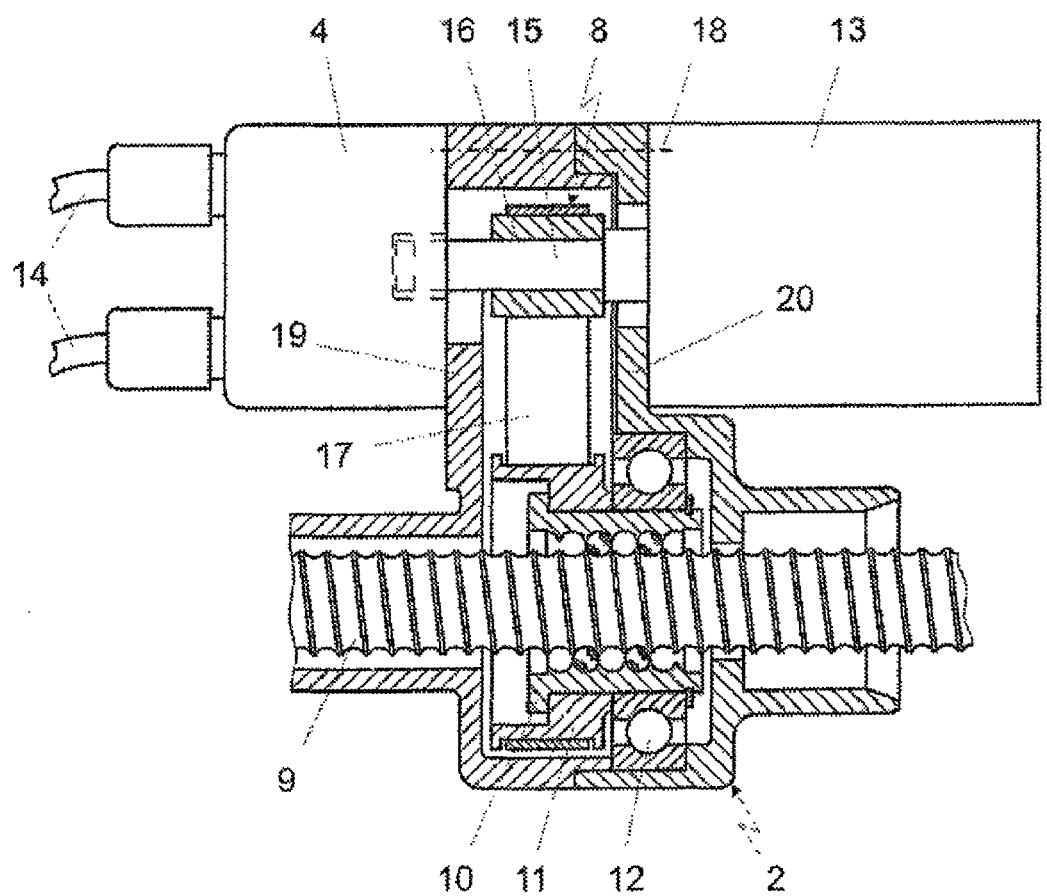
FIG. 2 is a longitudinal view of sections of the steering device along the rack in the region of the electric power-steering device or servo unit.

As shown in FIG. 2, the rack 5 engages at a toothed section, which is not shown, with the pinion 8 of a steering axle, which is not depicted in greater detail. The rack 5 comprises an external thread on a spindle section 9, which is engaged with a recirculating ball nut 10.

The recirculating ball nut 10, which is supported in an axially fixed manner, and the rack 5 form a translation screw. The recirculating ball nut 10 is connected to a pulley 11 of the servo gearbox 8 in a rotationally fixed manner and is supported by way of a radial bearing 12, in a part of the steering gearbox housing 1 that is formed as the gearbox housing part 2.

The electric motor 13 and the open-loop/closed-loop control unit 4 are disposed parallel to the rack 5. A second pulley 16 having a smaller diameter is disposed on a drive shaft 15 of the electric motor 13. A traction mechanism serving as a belt 17 is tensioned by way of the two pulleys 11 and 16 and, together therewith, forms the servo gearbox 8 in the form of a traction drive.

As shown, the electric motor 13, which serves as a motor unit and includes the motor housing thereof, and a control unit 4 including a control device housing thereof, in the interior of which the control unit 4 is located, are disposed on different sides of the servo gearbox 8. Separating the electric motor 13 from the control unit 4 in this arrangement, as close as possible to the belt 17 but on different sides, results in a compact unit which is disposed approximately symmetrically with respect to the recirculating ball gear and therefore makes optimal use of the available installation space between the exhaust system or the oil pan and the wheel well.

The connection between the housing of the electric motor 13 and the control device housing of the control unit 4 is implemented to the radial exterior of the servo gearbox 8 by way of a flange 19 on the control device housing and by way of a flange 20 on the motor housing. This creates a compact unit, which is closed to the outside and has no exposed electrical control or power lines. The control device 4 and the electric motor 13 can be interconnected by way of lines which are disposed within the two housings and are routed through the servo gearbox 8 (not shown separately). As shown in FIG. 2, the control and power lines 14 are routed into the control device housing, and from there they are routed further.

The connection of the two flanges 19 and 20, which is not depicted here, can be implemented in any manner, for example by way of a threaded connection with screws distributed around the circumference, as indicated by reference numeral "18".

Figure 3:
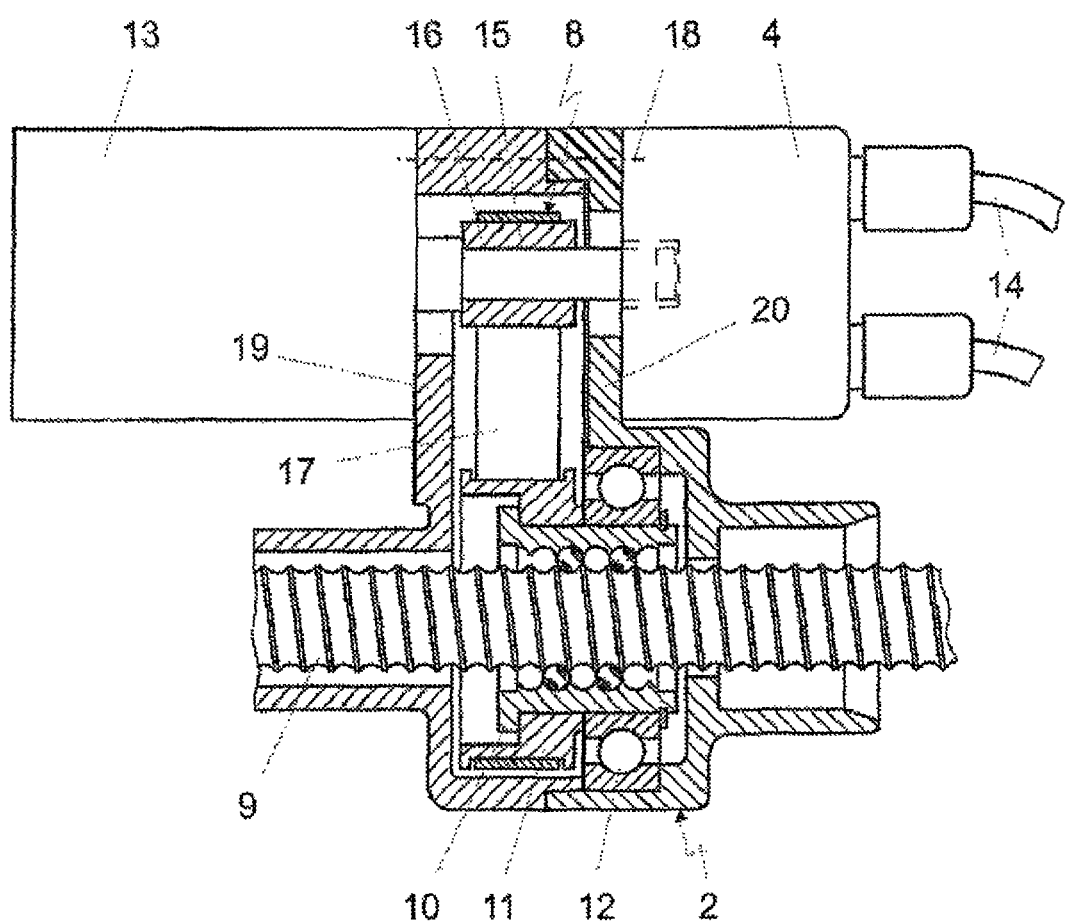
FIG. 3 is a longitudinal view, similar to the longitudinal view according to FIG. 2, in which the positions of the electric motor and the control unit are switched.

Because the exemplary embodiment depicted in FIG. 3 has substantially the same design as that shown in FIG. 2, why the same reference characters were used. The only difference is the placement of the electric motor 13 and the control unit 4, the positions of which are switched relative to FIG. 2. In this manner, the most favorable steering variant for a particular case can be created, depending on the installation space available.

LIST OF REFERENCE NUMERALS

1 steering gearbox housing
2 gearbox cover
3 electric motor
4 open-loop/closed-loop control unit
5 rack
6 pinion
7 torque sensor
8 servo gearbox
9 spindle section
10 recirculating ball nut
11 pulley
12 radial bearing
13 electric motor
14 control and power lines
15 drive shaft
16 pulley
17 belt
18 threaded connection
19 flange
20 flange

The invention claimed is:

1. A steering device for a motor vehicle, comprising an axially parallel drive which has a steering gearbox housing, a steering axle, a steering element, and at least one axle steering mechanism connected to the steering element, which comprises a motor unit disposed on the steering gearbox housing, comprising a servo gearbox disposed in a gearbox cover and a control unit for the motor unit disposed in a control device housing, the control device housing of the control unit being disposed on one axially parallel side of the servo gearbox, and a motor housing of the motor unit is disposed on the other axially parallel side of the servo gearbox.

2. The steering device according to claim 1, wherein the control device housing and the motor housing are each equipped with a flange, wherein the servo gearbox is disposed between the two flanges.

3. The steering device according to claim 1, wherein the control device housing and the motor housing are interconnected to the radial exterior of the servo gearbox.

4. The steering device according to claim 3, wherein the control device housing and the motor housing are interconnected by way of the two flanges.

5. The steering device according to claim 3, wherein the control device housing and the motor housing are interconnected by way of a threaded connection.

6. The steering device according to claim 1, wherein the servo gearbox comprises a traction drive having a belt and a pulley.

7. The steering device according to claim 1, wherein the motor unit comprises an electric motor, which is connected by way of a recirculating ball gear to a spindle section of a rack as the steering element.

* * * * *